United States Patent
Tanooka et al.

(10) Patent No.: US 11,807,108 B2
(45) Date of Patent: Nov. 7, 2023

(54) VEHICLE CONTROL DEVICE

(71) Applicant: MITSUBISHI JIDOSHA KOGYO KABUSHIKI KAISHA, Tokyo (JP)

(72) Inventors: Wataru Tanooka, Tokyo (JP); Yutaro Okamura, Tokyo (JP); Ryota Takahashi, Tokyo (JP); Naoki Takahashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 17/762,918

(22) PCT Filed: Mar. 29, 2021

(86) PCT No.: PCT/JP2021/013225
§ 371 (c)(1),
(2) Date: Mar. 23, 2022

(87) PCT Pub. No.: WO2021/210373
PCT Pub. Date: Oct. 21, 2021

(65) Prior Publication Data
US 2022/0396155 A1 Dec. 15, 2022

(30) Foreign Application Priority Data

Apr. 14, 2020 (JP) ................................. 2020-072082

(51) Int. Cl.
*B60L 15/20* (2006.01)
*B60L 3/10* (2006.01)

(52) U.S. Cl.
CPC ........... *B60L 15/2036* (2013.01); *B60L 3/102* (2013.01); *B60L 2240/12* (2013.01); *B60L 2240/423* (2013.01); *B60L 2240/465* (2013.01)

(58) Field of Classification Search
None
See application file for complete search history.

(56) References Cited

U.S. PATENT DOCUMENTS

| 10,144,293 B2 * | 12/2018 | Suzuki .................... B60T 8/175 |
| 2016/0221446 A1 | 8/2016 | Suzuki et al. |
| 2017/0261326 A1 | 9/2017 | Mizutani et al. |

FOREIGN PATENT DOCUMENTS

| CN | 105517839 A | 4/2016 |
| CN | 107074242 A | 8/2017 |

(Continued)

OTHER PUBLICATIONS

Extended European Search Report dated Jan. 24, 2023 in corresponding European Patent Application No. 21 788 970.8.

(Continued)

*Primary Examiner* — Todd Melton
(74) *Attorney, Agent, or Firm* — Birch, Stewart, Kolasch & Birch, LLP

(57) ABSTRACT

A vehicle control device that calculates a vehicle body velocity of a vehicle is disclosed. Sensors (18, 19) that obtain respective wheel velocities of left and right wheels (5) arranged along the vehicle width direction are provided. A calculator (11) that calculates, when the left and right wheels (5) are not slipping, an average value (A) of the wheel velocities as the vehicle body, and calculates, when at least one of the left and right wheels (5) is slipping, the vehicle body velocity on the basis of the average value (A) and a lower velocity value (B) between the wheel velocities is provided. With this configuration, the precision in calculating the vehicle body velocity is enhanced, suppressing a cost rise.

12 Claims, 3 Drawing Sheets

(56) References Cited

FOREIGN PATENT DOCUMENTS

| | | |
|---|---|---|
| EP | 3 031 663 A1 | 6/2016 |
| JP | 6-222066 A | 8/1994 |
| JP | 2009-119958 A | 6/2009 |

OTHER PUBLICATIONS

International Search Report, issued in PCT/JP2021/013225, PCT/ISA/210, dated May 11, 2021.
Written Opinion of the International Searching Authority, issued in PCT/JP2021/013225, PCT/ISA/237, dated May 11, 2021.
Chinese Office Action and Search Report for Chinese Application No. 202180005505.5, dated Apr. 27, 2023, with an English translation.

* cited by examiner (A)

(B)

VEHICLE CONTROL DEVICE

TECHNICAL FIELD

The present invention relates to a vehicle control device that calculates a vehicle body velocity of a vehicle.

BACKGROUND TECHNIQUE

A technique to enhance the precision in calculating by considering slipping and locking of the wheels has conventionally existed for calculating a vehicle body velocity (vehicle velocity) of a vehicle. For example, one of the known methods calculates the vehicle body velocity based on the wheel velocity at the time of non-slipping, and calculates the vehicle body velocity based on the longitudinal acceleration of the vehicle at the time of slipping (see Patent Document 1).

PRIOR ART REFERENCE

Patent Document

[Patent Document 1]
Japanese Laid-open Patent Publication No. HEI 6-222066 (JP 1994-222066 A)

SUMMARY OF INVENTION

Problems to be Solved by Invention

Grasping the longitudinal acceleration of a vehicle requires an acceleration sensor or a gyro sensor, and therefore has a problem that the cost is likely to rise. Further, for example, in the method described in Patent Document 1, the method of calculating the vehicle body velocity is largely different between at the time of slipping and at the time of non-slipping. Therefore, the change in the vehicle body velocity calculated at the time of transition from the non-slipping state to the slipping state (or vice versa) tends to be large and makes it difficult to enhance the precision in the calculation.

With the foregoing problems in view, one of the objects of the present invention is to provide a device for calculating a vehicle body velocity that enhances the precision in the calculating of a vehicle body velocity, suppressing the cost rise. In addition to this object, an effect which is derived from each configuration of "an embodiment to carry out the invention" to be described below and which conventional technique does not attain can be regarded as another object of the present disclosure.

Means to Solve Problems of Invention

The disclosed vehicle control device calculates a vehicle body velocity of a vehicle and includes a sensor that obtains information corresponding to respective wheel velocities of left and right wheels arranged along a vehicle width direction; and a calculator that calculates, when the left and right wheels are not slipping, an average value of the wheel velocities as the vehicle body velocity, and calculates, when at least one of the left and right wheels is slipping, the vehicle body velocity based on the average value and a lower velocity value being a lower one of the wheel velocities.

Effect of Invention

The disclosed vehicle control device can enhance the precision in calculating a vehicle body velocity, suppressing the cost rise.

BRIEF DESCRIPTION OF DRAWINGS

FIG. 6A is a graph showing an example of a relationship between an absolute value C of velocity difference and a first criterion $E_1$, and FIG. 6(B) is a graph showing a relationship between a time-derivative value D and a second criterion $E_2$.

EMBODIMENT TO CARRY OUR INVENTION

1. Vehicle

Figure 1:
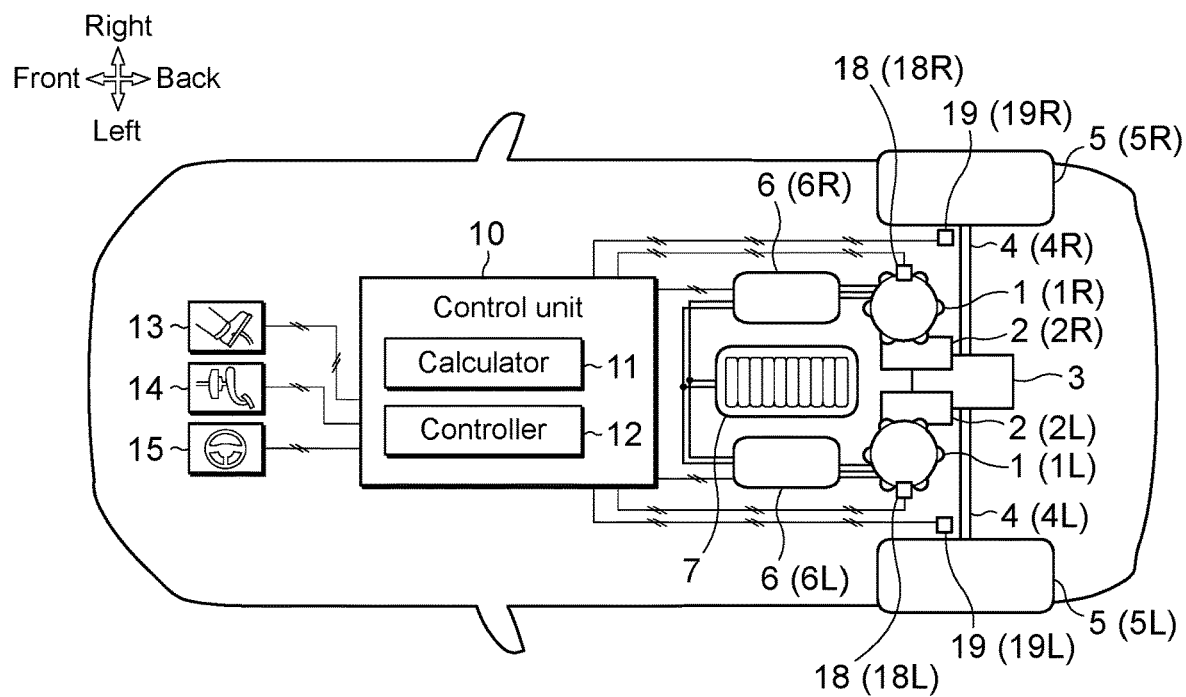
FIG. 1 is a schematic diagram showing a vehicle adopting a vehicle control device according to an embodiment.

Referring to FIGS. 1 to 6, description will now be made in relation to a vehicle control device according to an embodiment will now be described. This vehicle control device has a function of calculating a velocity V of vehicle body (hereinafter also referred to as a "vehicle body velocity V") of the vehicle shown in FIG. 1. The vehicle is mounted with a pair of motors 1 that drive the left and right wheels 5 (here rear wheels) arranged side by side along the vehicle width direction and a differential mechanism 3 that applies a torque difference to the left and right wheels 5. In this example, suffix letters such as R and L, which are added to the numerical signs, represent the arrangement positions of the elements related to the signs (i.e., the positions on the right side and the left side of the vehicle). For example, a reference sign 5R represents one (i.e., right wheel) of the left and right wheels 5 positioned on the right side (Right) of the vehicle, and a reference sign 5L represents the other (i.e., left wheel) positioned on the left side (Left) of the vehicle.

The pair of motors 1 have a function of driving at least either of the front wheels and the rear wheels of the vehicle, and can have a function of driving all four wheels. Between the pair of motors 1, one positioned on the right side is also referred to as a right motor 1R (right motor) and the other positioned on the left side is also referred to as a left motor 1L (left motor). The right motor 1R and left motor 1L operate independently of each other, and can individually output the driving forces having different magnitudes from each other. These motors 1 are each coupled to the differential mechanism 3 via one of a pair of reduction mechanisms 2, which are separately provided from each other. The right motor 1R and the left motor 1L of the present embodiment have the same rated outputs.

Each reduction mechanism 2 is a mechanism that increases the torque by reducing the driving force output from the corresponding motor 1. The reduction ratio G of the reduction mechanism 2 is appropriately set according to the output characteristic and the performance of the motor 1. Between the pair of reduction mechanisms 2, one positioned on the right side is also referred to as a right reduction mechanism 2R, and the other positioned on the left side is also referred to as a left reduction mechanism 2L. The right reduction mechanism 2R and the left reduction mechanism 2L of the present embodiment have the same velocity reduction ratio G. If the torque performances of the motors 1 are sufficiently high, the reduction mechanisms 2 may be omitted.

The differential mechanism 3 is a differential mechanism directed to a vehicle and having a yaw control function, and is interposed between a wheel axle 4 (right wheel axle 4R) linked to the right wheel 5R and a wheel axle 4 (left wheel axle 4L) linked to the left wheel 5L. The yaw control function adjusts the yaw moment by actively controlling the sharing ratio of the driving forces (driving torques) of the left and right wheels, and stabilizes the posture of the vehicle. Inside the differential mechanism 3, a gear train such as a planetary gear mechanism and/or a differential gear mechanism is incorporated. The driving force transmitted from the pair of motors 1 is distributed to the left and right wheels 5 through the gear train.

Figure 2:
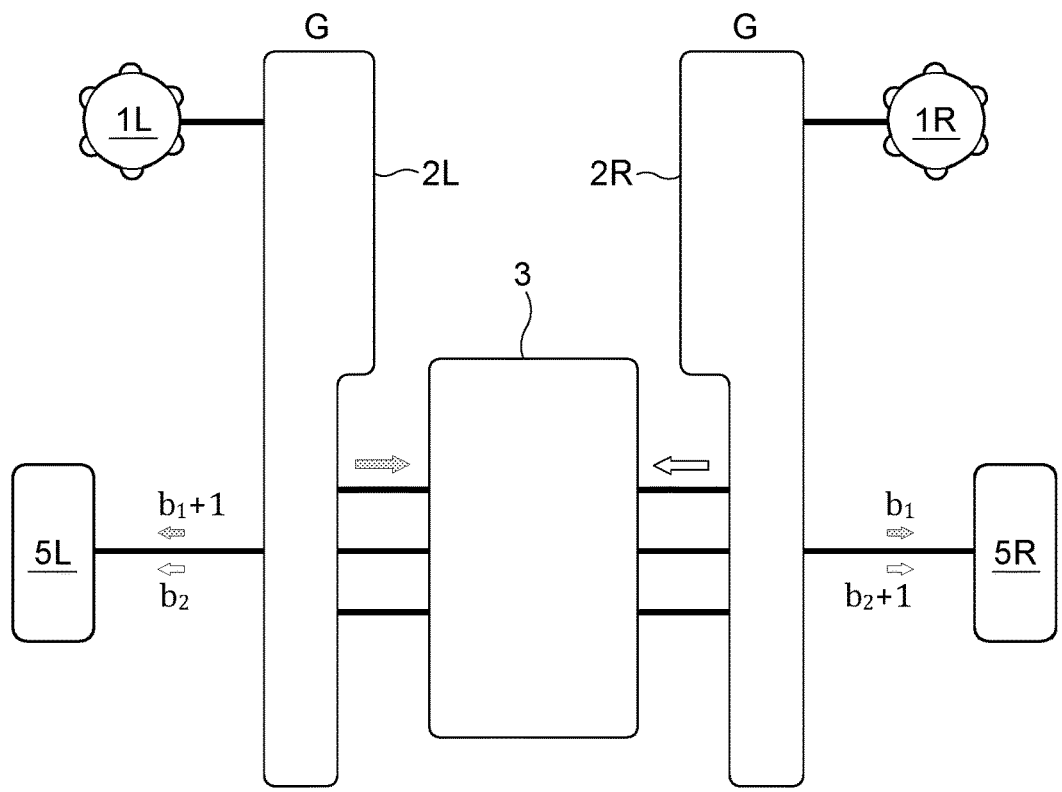
FIG. 2 is a schematic diagram showing a configuration of the driving system of the vehicle of FIG. 1.

FIG. 2 is a schematic diagram illustrating a configuration of the reduction mechanisms 2 and the differential mechanism 3. The reduction ratio G of each reduction mechanism 2 can be expressed as a ratio (or a ratio of the number of teeth of the gears) of the rotational angular velocity transmitted from the corresponding motor 1 to the reduction mechanism 2 and the rotational angular velocity transmitted from the reduction mechanism 2 to the differential mechanism 3. In the differential mechanism 3, the following expressions 1 and 2 are established in the present embodiment when the gear ratio of the path through which the driving force of the left motor 1L is transmitted to the right wheel 5R is expressed as $b_1$, the gear ratio of the path through which the driving force of the right motor 1R is transmitted to the left wheel 5L is expressed as $b_2$, the rotational angular velocities of the left and right motors 1 are respectively expressed as the motor angular velocities $\omega_{M1}$ and $\omega_{M2}$, and the rotational angular velocities of the left and right wheels are respectively expressed as the wheel velocities $\omega_R$ and $\omega_L$.

$\omega_{M1}=(b_2+1)*\omega_R-b_2*\omega_L$  (Expression 1)

$\omega_{M2}=(b_1+1)*\omega_L-b_1*\omega_R$  (Expression 2)

$\omega_{M1}$: motor angular velocity of the right motor
$\omega_{M2}$: motor angular velocity of the left motor
$\omega_R$: wheel velocity of the right wheel
$\omega_L$: wheel velocity of the left wheel
$b_1$: gear ratio of a right-wheel side in differential mechanism
$b_2$: gear ratio of a left-wheel side in differential mechanism As shown in FIG. 1, the motors 1 are electrically coupled to a battery 7 via inverters 6. The inverters 6 are electric-power-conversion devices (DC-AC convertors) that mutually convert the electric power (DC power, direct-current power) of the DC circuit of the battery 7 side and the electric power (AC power, alternating-current power) of the AC circuit of the motor 1 side. The battery 7 is, for example, a lithium-ion battery or a nickel-metal hydride battery, and is a secondary battery capable of supplying a high-voltage DC current of several hundred volts. While the motors 1 are power running 1, the DC power is converted into AC power by the inverters 6 and the converted AC power is then supplied to the motors 1. While the motors 1 are generating, the generated power is converted into DC power by the inverters 6 and the battery 7 is charged with the converted DC power.

The operating state of each inverter 6 is controlled by the control unit 10. The control unit 10 is a computer (electronic control unit) that controls the output of the motors 1 by managing the operating states of inverters 6. Inside the control unit 10, a processor (central processing unit), a memory (main memory), a storage device (storage), an interface device, and the like, which do not appear in the drawings, are included, and these elements are communicably coupled to each other via an internal bus. The control unit 10 of the present embodiment functions to precisely grasp the vehicle body velocity V (vehicle velocity), which is the traveling velocity of the vehicle, and also to control the torque difference between the left and right wheels 5 on the basis of the vehicle body velocity V.

As shown in FIG. 1, an accelerator sensor 13, a brake sensor 14, a steering angle sensor 15, resolvers 18, and wheel velocity sensors 19 are connected to the control unit 10. The accelerator sensor 13 is a sensor that detects the amount of depressing (accelerator opening degree) of the accelerator pedal and the depression velocity. The brake sensor 14 is a sensor that detects the amount of depressing (brake pedal stroke) of the brake pedal and the depression velocity. The steering sensor 15 is a sensor that detects a steering angle (actual steering angle or steering angle of the steering) of the left and right wheels 5.

The resolvers 18 are sensors that detect the rotational angular velocities (motor angular velocities $\omega_{M1}$ and $\omega_{M2}$) of the motors 1, and are provided one for each of the motors 1. Similarly, the wheel velocity sensors 19 are sensors that detect the rotational angular velocities (wheel velocities $\omega_R$ and $\omega_L$) of the left and right wheels 5 (or wheel axles 4), and are provided one in the vicinity of each of the right wheel 5R and the left wheel 5L. The control unit 10 controls the operating state of the pair of motors 1 on the basis of the information detected by these sensors 13-15, 18, and 19. In the present embodiment, the resolvers 18 and the wheel velocity sensors 19 function as "sensors that obtain information corresponding to the respective wheel velocities $\omega_R$ and $\omega_L$ of the left and right wheels 5".

2. Control Unit

As shown in FIG. 1, at least a calculator 11 and a controller 12 are provided in the control unit 10. These elements represent functions of the control unit 10 being classified convenience. These elements may be described as independent programs, or may be described as a composite program in which multiple elements are combined. The program corresponding to each element is stored in the memory or the storage device of the control unit 10 and executed by the processor. Alternatively, the calculator 11 and the controller 12 may be provided in the inverter 6.

The calculator 11 calculates the vehicle body velocity V based on the information corresponding to the wheel velocities $\omega_R$ and $\omega_L$ of the left and right wheels 5. Specific examples of information corresponding to the wheel velocities $\omega_R$ and $\omega_L$ of the left and right wheels 5 include information of the motor angular velocities $\omega_{M1}$ and $\omega_{M2}$ detected by the resolvers 18, information of the wheel velocities $\omega_R$ and $\omega_L$ detected by the wheel velocity sensors 19, and information of the rotational velocities input from the reduction mechanisms 2 to the differential mechanism 3. The information of the vehicle body velocity V calculated here is transmitted to the controller 12.

The controller 12 controls the torque difference between the left and right wheels 5 on the basis of the vehicle body velocity V calculated by the calculator 11. In this example, the output of each motor 1 is controlled on the basis of the accelerator opening degree, the brake pedal stroke, the steering angle, for example, and the output torque of each motor 1 is controlled such that the torque difference between the left and right wheels 5 does not exceed the maximum torque difference corresponding to the vehicle body velocity V. In the present embodiment, the operating states of the inverters 6 corresponding one to each of the right motor 1R and the left motor 1L are controlled according to the vehicle body velocity V.

Figure 3:
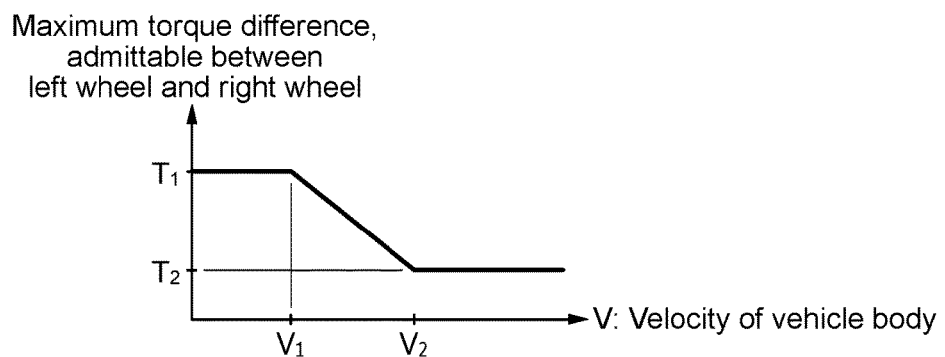
FIG. 3 is a graph illustrating an example of a relationship between a vehicle body velocity calculated in a control unit shown in FIG. 1 and a maximum torque difference admittable between the left and right wheels.

FIG. 3 is a graph showing a relationship between the maximum torque difference of the left and right wheels 5 controlled by the controller 12 and the vehicle body velocity V (which is denoted "velocity of vehicle body" in the drawings). The maximum torque difference admittable between the left and right wheels 5 is controlled so as to decrease as the vehicle body velocity V increases. For example, when the vehicle body velocity V is less than a first vehicle body velocity $V_1$, the torque difference up to a first torque difference $T_1$ is allowed for the left and right wheels 5. When the vehicle body velocity V is equal to or higher than a second vehicle body velocity $V_2$, the maximum torque difference between the left and right wheels 5 is limited to the second torque difference $T_2$ smaller than the first torque difference $T_1$. When the vehicle body velocity V is equal to or higher than the first vehicle body velocity $V_1$ and less than the second vehicle body velocity $V_2$, the maximum torque difference is set to decrease toward the second torque difference $T_2$ as the vehicle body velocity V increases.

Figure 4:
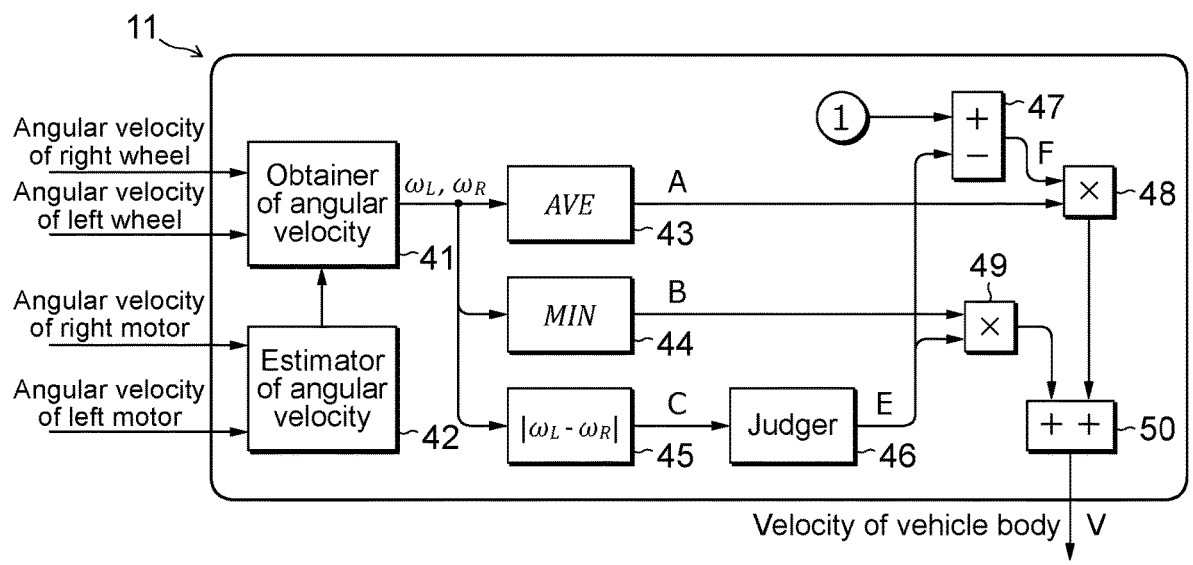
FIG. 4 is a block diagram illustrating the contents of an arithmetic operation performed in the control unit shown in FIG. 1.

FIG. 4 is a schematic block diagram showing functions of the controller 12 classified for convenience. The controller 12 is provided with an obtainer 41 of wheel velocity, an estimator 42 of wheel velocity, a calculator 43 of average value, a selector 44 for lower velocity value, a calculator 45 of absolute value of velocity difference, a judger 46, a subtractor 47, a first multiplier 48, a second multiplier 49, and an adder 50.

The obtainer 41 of wheel velocity obtains information of wheel velocities $\omega_R$ and $\omega_L$ detected by the wheel velocity sensors 19. If the information of the wheel velocity sensor 19 can be used, the obtainer 41 of wheel velocity obtains the information of the wheel velocities $\omega_R$ and $\omega_L$. On the other hand, the estimator 42 of wheel velocity calculates values corresponding to the wheel velocities $\omega_R$ and $\omega_L$ based on the motor angular velocities $\omega_{M1}$, $\omega_{M2}$ detected by the resolvers 18. The estimator 42 of wheel velocity has a function of, if not using (or not available) the information of the wheel velocity sensor 19, calculating values corresponding to the wheel velocities $\omega_R$ and $\omega_L$ by using the information of the motor angular velocities $\omega_{M1}$ and $\omega_{M2}$. Here, for example, values corresponding to the wheel velocities $\omega_R$ and $\omega_L$ are calculated, using Expressions 1 and 2, and the calculated values are transmitted to the obtainer 41 of wheel velocity.

The calculator 43 of average value calculates an average value A of the left and right wheel velocities $\omega_R$ and $\omega_L$. The average value A calculated here includes, for example, an arithmetic average, a geometric average, or a harmonized average. When arithmetic average is used, the average value A is half the sum of the right-wheel velocity $\omega_R$ and the left-wheel velocity $\omega_L$. When a harmonic average is used, the average value A is twice $(2/\{(1/\omega_R)+(1/\omega_L)\})$ the reciprocal of the sum of the reciprocal $(1/\omega_R)$ of the right wheel velocity and the reciprocal $(1/\omega_L)$ of the left wheel velocity. These average values A are considered to be close to the value of the actual traveling velocity in the non-slipping state of the vehicle. The information of the average value A calculated here is transmitted to the first multiplier 48.

The selector 44 for lower velocity value selects a lower velocity value B which is the lower wheel velocity between the left and right wheel velocities $\omega_R$ and $\omega_L$. In relation to the lower velocity value B, in the slipping state of the left and right wheels 5, the slipping wheel rotates at a higher velocity than the actual traveling velocity. Therefore, the wheel velocity on the low-velocity side has a possibility of being closer to the n actual traveling velocity as compared with the wheel velocity on the high-velocity side, and the possibility is considered to increase as the degree of slipping increases. The information of the lower velocity value B selected here is transmitted to the second multiplier 49.

The calculator 45 of absolute value of velocity difference calculates an absolute value C of the velocity difference, which is an absolute value of the difference between the left and right wheel velocities $\omega_R$ and $\omega_L$. The information of the calculated absolute value C of velocity difference is transmitted to the judger 46. The absolute value C of velocity difference is almost zero when the vehicle is traveling straight, but comes to be greater as the degree of slipping is increased when at least one of the right and left wheels 5 is slipping. On the other hand, even if the vehicle is not slipping, the absolute value C of velocity difference may increase to some extent when the vehicle is turning.

The judger 46 calculates a criterion E which is an index value obtained by quantifying the degree of slipping of the left and right wheels 5. The domain of the criterion E is, for example, a range from 0 to 1. The criterion E closer to 0 indicates that the degree of slipping of the left and right wheels are lower, and the criterion E closer to 1 indicates that the degree of slipping of the left and right wheels 5 are higher. When the left and right wheels 5 are not slipping, the criterion E is 0. The criterion E is calculated on the basis of the absolute value C of velocity difference. For example, the criterion E is calculated to be a larger value as the absolute value C of velocity difference is larger. A specific method of calculating the criterion E will be described below. The information of the criterion E calculated here is transmitted to the subtractor 47 and the second multiplier 49.

The subtractor 47 calculates a toggle value F, which is an index value obtained by quantifying the degree of non-slipping of the vehicle. The toggle value F is a value obtained by inverting the criterion E, and is calculated, for example, by subtracting the criterion E from 1. In this case, the toggle value F is calculated such that the sum of the toggle value F and the criterion E becomes 1. The domain of the toggle value F is, for example, a range from 0 to 1 like the criterion E. The information of the toggle value F calculated here is transmitted to the first multiplier 48.

The first multiplier 48 calculates the product of the average value A and the toggle value F. The value of the product calculated here becomes 0 at the minimum and becomes the average value A at the maximum. The value of the calculated product increases as the toggle value F is larger (i.e., the criterion E is smaller). The information of the calculated product is transmitted to the adder 50.

The second multiplier 49 calculates the product of the lower velocity value B and the criterion E. The value of the product calculated here becomes 0 at the minimum and becomes the lower velocity value B at the maximum. The value of the calculated product increases as the criterion E is larger (i.e., the toggle value F is smaller). The information of the calculated product is transmitted to the adder 50.

The adder 50 calculate, as the vehicle body velocity V, the sum (V=A*F+B*E=Ax(1−E)+B*E) of the product transmitted from the first multiplier 48 and the product transmitted from the second multiplier 49. The calculated vehicle body velocity V becomes a value closer to the average value A as the degree of slipping of the left and right wheels 5 is lower and therefore the criterion E is closer to 0. On the other hand, when the degree of slipping of the left and right wheels 5 is high and the criterion E is closer to 1, the vehicle body velocity V becomes closer to the lower velocity value B. As the above, the adder 50 has a function of estimating the vehicle body velocity V ranging between the average value A and the lower velocity value B on the basis of the degree of slipping of the left and right wheels 5.

The calculating unit 11 of the present embodiment has a function of "calculating the average value A of the wheel velocities $\omega_R$ and $\omega_L$ as the vehicle body velocity V when the left and right wheels 5 are not slipping, and calculating the vehicle body velocity V based on the average value A and the lower velocity value B when at least one of the left and right wheels 5 is slipping". For example, since the criterion E is 0 and also the toggle value F is 1 if the right and left wheels 5 are not slipping, the vehicle body velocity V becomes a value equal to the average value A (i.e. V=A). If at least one of the right and left wheels 5 is slipping even slightly, the value of the vehicle body velocity V falls within the range between the average value A and the lower velocity value B.

Since the value of the vehicle body velocity V is equal to the sum of the product of the average value A and the toggle value F and the product of the lower velocity value B and the criterion E, a smaller criterion E (i.e., a larger toggle value F which means a lower degree of slipping of the left and right wheels 5) makes the value of the vehicle body velocity V closer to the average value A. Conversely, a larger criterion E (i.e., a smaller toggle value F which means a high degree of slipping of the left and right wheels 5) makes the value of the vehicle body velocity V closer to the lower velocity value B.

Figure 5:
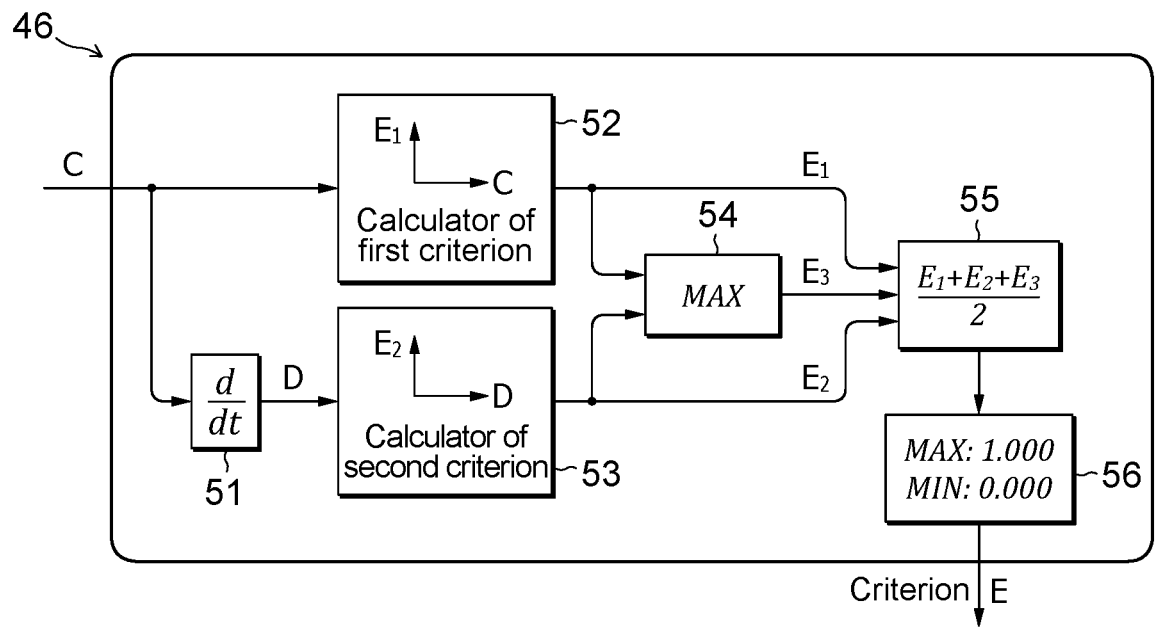
FIG. 5 is a block diagram illustrating the contents of an arithmetic operation performed in a judger shown in FIG. 4.

A specific method of calculating the criterion E will be detailed below. FIG. 5 is a schematic block diagram showing functions of the judger 46 classified for convenience. The judger 46 is provided with a differential calculator 51, a calculator 52 of first criterion, a calculator 53 of second criterion, a selector 54 of maximum value, a calculator 55 of criterion, and a limiter 56 of criterion. The information of the absolute value C of velocity difference input from the calculator 45 of absolute value of velocity difference to the judger 46 is transmitted to the differential calculator 51 and the calculator 52 of first criterion.

The differential calculator 51 calculates a time-derivative value D corresponding to a value obtained by time differentiating the absolute value C of velocity difference. The time-derivative value D is the amount of change per unit time of the absolute value C of velocity difference. If the time interval at which the information of the absolute value C of velocity difference is input into the differential calculator 51 is n regarded as the time corresponding to a unit time, the difference between the present absolute value C of velocity difference and the previous absolute value C of velocity difference becomes a parameter corresponding to the time-derivative value D. The information of the calculated time-derivative value D is transmitted to the calculator 53 of second criterion.

The calculator 52 of first criterion calculates a first criterion $E_1$ based on the absolute value C of velocity difference, and the calculator 53 of second criterion calculates a second criterion $E_2$ based on the time-derivative value D. The first criterion $E_1$ and the second criterion $E_2$ are index values for evaluating the degree of slipping of the left and right wheels 5. The calculator 52 of first criterion stores a mathematical expression, a graph, a map, and/or the like that define a correspondence relationship between the absolute value C of velocity difference and the first criterion $E_1$, and the calculator 53 of second criterion stores a mathematical expression, a graph, a map, and/or the like that defines a correspondence relationship between the time-derivative value D and the second criterion $E_2$.

FIG. 6(A) is an example of a map that defines correspondence relationship between the absolute value C of velocity difference and the first criterion $E_1$. According to the map shown in FIG. 6(A), the value of the first criterion $E_1$ is defined as a decimal number having a three-place decimal. When absolute value C of velocity difference is less than a first predetermined value $C_1$, the first criterion $E_1$ is set to 0. When the absolute value C of velocity difference is equal to or larger than a second predetermined value $C_2$, the first criterion $E_1$ is set to 1. When the absolute value C of velocity difference is equal to or larger than the first predetermined value $C_1$ and less than the second predetermined value $C_2$, the first criterion $E_1$ is set to increase toward 1 as the absolute value C of velocity difference increases. The information of the first criterion $E_1$ calculated by the calculator 52 of first criterion is transmitted to the selector 54 of maximum value and the calculator 55 of criterion.

Figure 6:
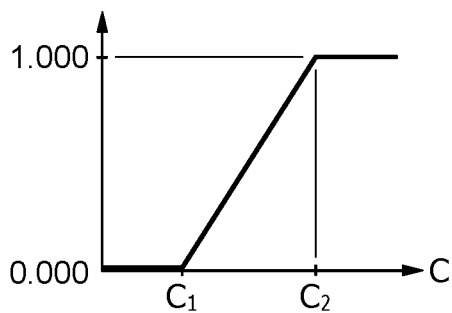
FIG. 6 is graphs showing a method of setting criteria calculated in the judger shown in FIG. 5.
Figure 6:
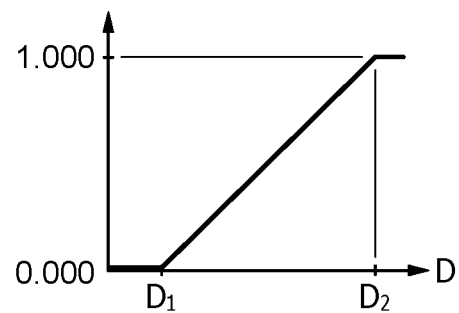

Similarly, FIG. 6(B) is an example of a map that defines a correspondence relationship between the time-derivative value D and the second criterion $E_2$. According to the map shown in FIG. 6 (B), the value of the second criterion $E_2$ is defined as a decimal number having a three-place decimal. When the time-derivative value D is less than a first derivative value $D_1$, the value of the second criterion $E_2$ is set to 0. When the time-derivative value D is equal to or greater than a second derivative value $D_2$, the value of the criterion $E_2$ is set to 1. When the time-derivative value D is equal to or larger than the first derivative value $D_1$ and less than the second derivative value $D_2$, the value of the criterion $E_2$ is set to increase toward 1 as the time-derivative value D increases. The information of the second criterion $E_2$ calculated by the calculator 53 of second criterion is transmitted to the selector 54 of maximum value and the calculator 55 of criterion.

The selector 54 of maximum value selects a larger one between the first criterion $E_1$ and the second criterion $E_2$, and sets the selected criterion as the third criterion $E_3$. The third criterion $E_3$ is a parameter that is set to more intensively reflect the value of the larger one between the first criterion $E_1$ and the criterion $E_2$ onto the criterion E finally calculated by the calculator 11. The information of the set third criterion $E_3$ is transmitted to the calculator 55 of criterion.

The calculator 55 of criterion calculates a criterion E representing a degree of slipping on the basis of at least the first criterion $E_1$ and the second criterion $E_2$. The criterion E is set to a value at least larger than the minimum value among the criteria $E_1$ to $E_3$, and is preferably set to a value larger than the average value of the first criterion $E_1$ and the second criterion $E_2$. In the calculator 55 of criterion of the present embodiment, the criterion E is calculated on the basis of the first criterion $E_1$, the second criterion $E_2$, and the third criterion $E_3$. For example, a half of the sum of the first criterion $E_1$, the second criterion $E_2$, and the third criterion $E_3$ is calculated as the criterion E. The information of the calculated criterion E is transmitted to the limiter 56 of criterion.

The limiter 56 of criterion limits the upper limit value and the lower limit value of the value calculated by the calculator 55 of criterion so that the calculated value does not deviate from the domain of the criterion E. For example, when the criterion E transmitted from the calculator 55 of criterion is less than 0, the value is corrected to 0, and when the criterion E exceeds 1, the value is corrected to 1. Note that, depending on the method of calculating the criterion E in the calculator 55 of criterion, the value calculated by the calculator 55 of criterion can be set within the domain of the criterion E. Such a case may omit the limiter 56 of criterion.

3. Influence and Effect (1) In the above embodiment, sensors (e.g., resolvers 18 and wheel velocity sensors 19) that obtain information corresponding to the respective wheel velocities $\omega_R$ and $\omega_L$ of the left and right wheels are provided, and a calculator 11 that calculates the vehicle body velocity V based on information detected by the sensors is provided in the control unit 10. The calculator 11 calculates the average value A of the wheel velocities $\omega_R$ and $\omega_L$ as the vehicle body velocity V when the left and right wheels 5 are not slipping. On the other hand, when at least one of the right and left wheels 5 is slipping, the calculator 11 calculates the vehicle body velocity V based on the average value A and the lower velocity value B.

With this configuration, it is possible to grasp the vehicle body velocity V even if the wheel velocity information of all four wheels cannot be used. In addition, it is possible to estimate the slipping state and the vehicle body velocity V only from the information corresponding to the wheel velocities $\omega_R$ and $\omega_L$ of the left and right wheels. Incidentally, since the longitudinal acceleration of the vehicle are not referred, the acceleration sensor and/or the gyro sensor may be omitted and the disclosed technique can be carried out in a simple configuration at relatively low costs.

Furthermore, differentiating the method of estimating (i.e., the parameter used to calculate the vehicle body velocity V) between the time of the non-slipping and the time of the slipping makes it possible to enhance the precision in the calculating the vehicle body velocity V. On the other hand, the method of estimating at the time of non-slipping is a method positioned on the extension line of the method of estimating at the time of slipping (the Expression "V=A*F+B*E" for calculation is common to the time of non-slipping and the time of slipping, and E=0 corresponds to the time of non-slipping, and E>0 corresponds to the time of slipping), so that the change of the vehicle body velocity calculated at the time of transition from the non-slipping state to the slipping state (or vice versa) is small and the precision in calculating can be enhanced. Therefore, the above-described vehicle control device can enhance the precision in calculating of the vehicle body velocity V while suppressing cost rise.

(2) In the above embodiment, the calculator 11 determines the degree of slipping of the right and left wheels 5. Further, when the degree of slipping is lower (i.e., the criterion E is smaller), the calculated vehicle body velocity V is closer to the average value A whereas when the degree of slipping is higher (i.e., the criterion E is larger), the calculated vehicle body velocity V is closer to the lower velocity value B. With this configuration, it is possible to reduce the error in arithmetic operation caused from the slipping of the left and right wheels 5. Therefore, it is possible to further enhance the precision in calculating of the vehicle body velocity V.

(3) In the above-described embodiment, the first criterion $E_1$ is set on the basis of the absolute value C of velocity difference of the respective wheel velocities $\omega_R$ and $\omega_L$, and the second criterion $E_2$ is set on the basis of the time-derivative value D of the absolute value C. Further, the degree of slipping is determined on the basis of at least the first criterion $E_1$ and the second criterion $E_2$. With this configuration, the degree of slipping can be objectively evaluated using both the first criterion $E_1$ derived from the velocity difference and the second criterion $E_2$ derived from the time-differential value of the velocity difference, so that an appropriate criterion E can be obtained. Therefore, the slip state and the change thereof can be precisely grasped so that it is possible to further enhance the precision in calculating of the vehicle body velocity V. In particular, when the velocity difference between the respective wheel velocities $\omega_R$ and $\omega_L$ changes due to slipping, the change can be immediately reflected in the criterion E, and can be quickly reflected in the value of the vehicle body velocity V.

(4) In the above embodiment, a pair of motors 1 are coupled to the differential mechanism 3 that provides a torque difference to the left and right wheels 5, the motor angular velocities of the motors 1 are detected by a pair of resolvers 18. Besides, the calculator 11 calculates the respective wheel velocities $\omega_R$ and $\omega_L$ of the left and right wheels 5 based on the motor angular velocities $\omega_1$ and $\omega_2$ detected by the resolvers 18. With this configuration, it is possible to grasp the vehicle body velocity V without depending on the wheel velocity sensors 19.

Further, by preparing multiple methods of calculating the vehicle body velocity V, it is possible to enhance the robustness of the control against sensor failure. For example, even if the wheel velocity sensors 19 fail, the vehicle body velocity V can be calculated. The final vehicle body velocity V may be determined by referring to both a vehicle body velocity V calculated on the basis of the wheel velocities $\omega_R$ and $\omega_L$ and a vehicle body velocity V calculated on the basis of the motor angular velocities $\omega_{M1}$ and $\omega_{M2}$. With this configuration, it is possible to further enhance the precision in calculating of the vehicle body velocity V.

(5) In the above embodiment, the controller 12 that controls the maximum torque difference between the left and right wheels 5 on the basis the vehicle body velocity V calculated by the calculator 11 is provided. For example, in accordance with the characteristics shown in FIG. 3, the controller 12 performs control to reduce the maximum torque difference admittable between the left and right wheels 5 as the vehicle body velocity V increases. With this configuration, the turning posture can be stabilized. Further, as compared with conventional technology, since the precision in calculating of the vehicle body velocity V is improved, the stability of the turning posture can be improved and the traveling performance of the vehicle can be enhanced.

4. Modification

The foregoing example is illustrative only and is not n intended to preclude the application of various modifications and techniques not explicitly set forth in the present examples. Each configuration of the present embodiment can be variously modified and implemented without departing from the scope thereof. Also, the configuration can be selected or omitted according to the requirement or appropriately combined.

For example, the above embodiment describes the vehicle control device applied to the rear wheels of a vehicle. Alternatively, the vehicle control device may be applied to the front wheels of a vehicle or to both the front and rear wheels of a vehicle in the same manner. If a vehicle is mounted with at least a sensor that obtains information corresponding to the respective wheel velocities $\omega_R$ and $\omega_L$ of the left and right wheels 5, the precision in calculating the vehicle body velocity can be enhance by performing the same control as that performed by the control unit 10, so that the same effects as those of the above-described embodiment can be obtained.

Further, in the above-described embodiment, the half value of the sum of the first criterion $E_1$, the second criterion $E_2$ and the third criterion $E_3$ is calculated as the criterion E, a specific method of calculating the criterion E is not limited to this. At least, by calculating the criterion E corresponding to the degree of slipping of the right and left wheels 5, the same effects as in those of the above embodiment can be obtained. Various known methods can be used for the method of calculating the criterion E corresponding to the degree of slipping.

REFERENCE SIGN LIST

1: motor
2: reduction mechanism
3: differential mechanism
4: wheel axle
5: left and right wheels
10: control unit
11: calculator
12: controller
18: resolver
19: sensor of wheel speed
A: average value
B: lower velocity value
C: absolute value of velocity difference
D: time-derivative value
E: criterion
F: toggle value
V: velocity of vehicle body

The invention claimed is:

1. A vehicle control device that calculates a vehicle body velocity of a vehicle, comprising
 a sensor that obtains information corresponding to respective wheel velocities of left and right wheels arranged along a vehicle width direction; and
 a calculator that calculates, when the left and right wheels are not slipping, an average value of the wheel velocities as the vehicle body velocity, and calculates, when at least one of the left and right wheels is slipping, the vehicle body velocity based on the average value and a lower velocity value being a lower one of the wheel velocities.

2. The vehicle control device according to claim 1, wherein
 the calculator judges a degree of slipping of the left and right wheels and calculates, as the vehicle body velocity, a value closer to the average value as the degree of slipping is lower and a value closer to the low velocity value as the degree of slipping is higher.

3. The vehicle control device according to claim 2, wherein
 the calculator judges the degree of slipping based on a first criterion and a second criterion, the first criterion being set on the basis of an absolute value of a difference between the wheel velocities, the second criterion being set on the basis of a time-derivative value of the absolute value.

4. The vehicle control device according to claim 3, further comprising:
 a pair of motors that are coupled to a differential mechanism, the differential mechanism providing a torque difference to the left and right wheels; and
 a pair of resolvers that detect motor angular velocities output from the motors, wherein
 the calculator calculates the wheel velocities based on the motor angular velocities.

5. The vehicle control device according to claim 4, further comprising:
 a controller that controls, based on the vehicle body velocity calculated by the calculator, a maximum torque difference between the left and right wheels.

6. The vehicle control device according to claim 3, further comprising:
 a controller that controls, based on the vehicle body velocity calculated by the calculator, a maximum torque difference between the left and right wheels.

7. The vehicle control device according to claim 2, further comprising:
 a pair of motors that are coupled to a differential mechanism, the differential mechanism providing a torque difference to the left and right wheels; and
 a pair of resolvers that detect motor angular velocities output from the motors, wherein
 the calculator calculates the wheel velocities based on the motor angular velocities.

8. The vehicle control device according to claim 7, further comprising:
 a controller that controls, based on the vehicle body velocity calculated by the calculator, a maximum torque difference between the left and right wheels.

9. The vehicle control device according to claim 2, further comprising:
 a controller that controls, based on the vehicle body velocity calculated by the calculator, a maximum torque difference between the left and right wheels.

10. The vehicle control device according to claim 1, further comprising:
 a pair of motors that are coupled to a differential mechanism, the differential mechanism providing a torque difference to the left and right wheels; and
 a pair of resolvers that detect motor angular velocities output from the motors, wherein
 the calculator calculates the wheel velocities based on the motor angular velocities.

11. The vehicle control device according to claim 10, further comprising:
 a controller that controls, based on the vehicle body velocity calculated by the calculator, a maximum torque difference between the left and right wheels.

12. The vehicle control device according to claim 1, further comprising:
 a controller that controls, based on the vehicle body velocity calculated by the calculator, a maximum torque difference between the left and right wheels.

* * * * *